US010006301B2

(12) United States Patent
Riehl (10) Patent No.: US 10,006,301 B2
(45) Date of Patent: Jun. 26, 2018

(54) VANE ASSEMBLY INCLUDING TWO- AND THREE-DIMENSIONAL ARRANGEMENTS OF CONTINUOUS FIBERS

(71) Applicant: United Technologies Corporation, Hartford, CT (US)

(72) Inventor: John D. Riehl, Hebron, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 312 days.

(21) Appl. No.: 14/894,555

(22) PCT Filed: May 27, 2014

(86) PCT No.: PCT/US2014/039484
§ 371 (c)(1),
(2) Date: Nov. 30, 2015

(87) PCT Pub. No.: WO2014/197233
PCT Pub. Date: Dec. 11, 2014

(65) Prior Publication Data
US 2016/0108746 A1 Apr. 21, 2016

Related U.S. Application Data

(60) Provisional application No. 61/830,693, filed on Jun. 4, 2013.

(51) Int. Cl.
*F02C 3/04* (2006.01)
*F01D 9/04* (2006.01)
(Continued)

(52) U.S. Cl.
CPC .............. *F01D 9/041* (2013.01); *B29C 70/22* (2013.01); *B29C 70/24* (2013.01); *F01D 5/147* (2013.01);
(Continued)

(58) Field of Classification Search
CPC ..... B29C 70/22; B29C 70/24; B29L 2031/08; F01D 25/28; F01D 5/147; F01D 5/28;
(Continued)

(56) References Cited

U.S. PATENT DOCUMENTS 3,849,023 A 11/1974 Klompas
4,098,559 A 7/1978 Price
(Continued)

FOREIGN PATENT DOCUMENTS

EP 0654586 5/1995
EP 1681439 7/2006
(Continued)

OTHER PUBLICATIONS

Unal, Pelin Gurkan (2012). 3D Woven Fabrics, Woven Fabrics, Prof. Han-Yong Jean (Ed.), ISBN: 978-953-51-0607-4, InTech, Available from: http://www.intechopen.com/books/woven-fabrics/3-d-woven-fabrics.
(Continued)

*Primary Examiner* — Jesse Bogue
(74) *Attorney, Agent, or Firm* — Carlson, Gaskey & Olds, P.C.

(57) ABSTRACT

A vane assembly includes a plurality of airfoils that extend from a first end to a second, opposed end. A first platform is at the first end and is joined to the plurality of airfoils. A second platform is at the second end and is joined to the plurality of airfoils. At least one of the first platform, the second platform and the plurality of airfoils include a three-dimensional arrangement of continuous fibers and at least one different one of the first platform, the second platform and the plurality of airfoils include a two-dimensional arrangement of continuous fibers.

17 Claims, 10 Drawing Sheets

(51) Int. Cl.
*F01D 5/14* (2006.01)
*F01D 5/28* (2006.01)
*B29C 70/24* (2006.01)
*B29C 70/22* (2006.01)
*F01D 25/28* (2006.01)
*B29L 31/08* (2006.01)

(52) U.S. Cl.
CPC ............... *F01D 5/28* (2013.01); *F01D 5/282* (2013.01); *F01D 5/284* (2013.01); *F01D 25/28* (2013.01); *B29L 2031/08* (2013.01); *F05D 2240/12* (2013.01); *F05D 2240/80* (2013.01); *F05D 2250/10* (2013.01); *F05D 2250/20* (2013.01); *F05D 2300/6033* (2013.01); *F05D 2300/6034* (2013.01); *F05D 2300/614* (2013.01)

(58) Field of Classification Search
CPC .......... F01D 5/282; F01D 5/284; F01D 9/041; F05D 2240/12; F05D 2240/80; F05D 2250/10; F05D 2250/20; F05D 2300/6033
See application file for complete search history.

(56) References Cited

U.S. PATENT DOCUMENTS

| | | | |
|---|---|---|---|
| 4,191,510 A | 3/1980 | Teysseyre et al. | |
| 4,655,682 A | 4/1987 | Kunz et al. | |
| 5,399,395 A | 3/1995 | Forman et al. | |
| 5,576,079 A | 11/1996 | Forman et al. | |
| 5,624,618 A | 4/1997 | Forman et al. | |
| 5,854,154 A * | 12/1998 | Radford | C04B 35/624 264/621 |
| 6,196,794 B1 * | 3/2001 | Matsumoto | B29C 65/5042 415/191 |
| 6,431,837 B1 | 8/2002 | Velicki | |
| 6,562,436 B2 * | 5/2003 | George | B32B 5/12 428/105 |
| 8,333,565 B2 | 12/2012 | McMillan | |
| 9,556,742 B2 * | 1/2017 | Parkin | F01D 5/147 |
| 2005/0084379 A1 | 4/2005 | Schreiber | |
| 2006/0130957 A1 | 6/2006 | Kostar et al. | |
| 2010/0056006 A1 | 3/2010 | Campbell | |
| 2010/0105269 A1 | 4/2010 | Goering | |
| 2010/0189566 A1 * | 7/2010 | Harrison | B29C 66/126 416/241 R |
| 2011/0111664 A1 | 5/2011 | Goering et al. | |
| 2011/0299976 A1 * | 12/2011 | Uskert | F01D 5/225 415/173.1 |
| 2012/0051935 A1 * | 3/2012 | Naik | F01D 5/147 416/230 |
| 2012/0099982 A1 | 4/2012 | Coupe | |
| 2013/0004326 A1 * | 1/2013 | McCaffrey | F01D 5/147 416/241 B |
| 2013/0004715 A1 | 1/2013 | Jarmon et al. | |
| 2013/0011271 A1 * | 1/2013 | Shi | F01D 5/28 416/230 |

FOREIGN PATENT DOCUMENTS

| | | |
|---|---|---|
| EP | 2210733 | 7/2010 |
| JP | H08 218802 | 8/1996 |
| JP | 2003148105 | 5/2003 |

OTHER PUBLICATIONS

International Search Report and Written Opinion for PCT Application No. PCT/US2014/039484, dated Sep. 23, 2014.
International Preliminary Report on Patentability for PCT Application No. PCT/US2014/039484 dated Dec. 17, 2015.
Supplementary European Search Report for European Patent Application No. 14808033 completed Dec. 1, 2016.

* cited by examiner

VANE ASSEMBLY INCLUDING TWO- AND THREE-DIMENSIONAL ARRANGEMENTS OF CONTINUOUS FIBERS

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

A vane assembly according to an example of the present disclosure includes a plurality of airfoils extending from a first end to a second, opposed end, and a first platform at the first end. The first platform is joined to the plurality of airfoils. A second platform is at the second end and is also joined to the plurality of airfoils. At least one of the first platform, the second platform and the plurality of airfoils includes a three-dimensional arrangement of continuous fibers and at least one different one of the first platform, the second platform and the plurality of airfoils includes a two-dimensional arrangement of continuous fibers.

In a further embodiment of any of the foregoing embodiments, the three-dimensional arrangement of fibers is a Pi-section having a wall and a plurality of legs protruding from one side of the wall.

In a further embodiment of any of the foregoing embodiments, the wall is the first platform and the plurality of legs is the plurality of airfoils.

In a further embodiment of any of the foregoing embodiments, the first platform and the plurality of airfoils include the three-dimensional arrangement of continuous fibers.

In a further embodiment of any of the foregoing embodiments, the second platform is a hollow structure including walls that define an interior cavity that opens at opposed ends.

In a further embodiment of any of the foregoing embodiments, the walls of the hollow structure include the three-dimensional arrangement of continuous fibers.

In a further embodiment of any of the foregoing embodiments, the walls includes a first portion extending around the interior cavity and attachment portions protruding outwardly from the first portion.

In a further embodiment of any of the foregoing embodiments, the each of the attachment portions includes a pair of coextending spaced-apart walls, between which one of the plurality of airfoils is received.

In a further embodiment of any of the foregoing embodiments, the hollow structure is joined with the plurality of airfoils by two-dimensional fabric plies.

In a further embodiment of any of the foregoing embodiments, a Pi-section joins at least one of the first platform and the second platform with the plurality of airfoils, the Pi-section has a wall and a plurality of legs protruding from one side of the wall, the wall being interfacially joined to the at least one of the first platform and the second platform, and the plurality of legs being interfacially joined with the plurality of airfoils.

In a further embodiment of any of the foregoing embodiments, at least one of the first platform and the second platform is joined to the plurality of airfoils at a distinct joint in which there is fiber discontinuity with respect to continuous fibers of the at least one of the first platform and the second platform and continuous fibers of the plurality of airfoils.

In a further embodiment of any of the foregoing embodiments, the first platform, the second platform and the plurality of airfoils are each formed of a fiber-reinforced organic matrix material.

In a further embodiment of any of the foregoing embodiments, the first platform, the second platform and the plurality of airfoils include transition areas there between that are free of noddle zones, the noddle zones being a plurality of stacked fiber plies each having a two-dimensional arrangement of continuous fibers, with an enlarged non-fiber area at a radius where the plurality of stacked fiber plies bend.

In a further embodiment of any of the foregoing embodiments, the three-dimensional arrangement of fibers includes a fiber repeat unit $U_{3D}$ having first continuous fibers $F1_{3D}$ and second continuous fibers $F2_{3D}$ that extend transversely to the first continuous fibers $F1_{3D}$ with respect to their longitudinal axes, and third continuous fibers $F3_{3D}$ that extend orthogonally to the first continuous fibers $F1_{3D}$ and the second continuous fibers $F2_{3D}$ with respect to their longitudinal axes; and the two-dimensional arrangement of fibers includes a fiber repeat unit $U_{2D}$ having first continuous fibers $F1_{2D}$ and second continuous fibers $F2_{2D}$ that extend transversely to the first continuous fibers $F1_{2D}$ with respect to their longitudinal axes, and the two-dimensional arrangement of fibers is free of any fibers that extend orthogonally to the first continuous fibers $F1_{2D}$ and the second continuous fibers $F2_{2D}$ with respect to their longitudinal axes.

A gas turbine engine according to an example of the present disclosure includes a compressor section, a combustor in fluid communication with the compressor section, a turbine section in fluid communication with the combustor, a core flow path through the compressor section, the combustor and the turbine section, and a vane assembly located in the core flow path. The vane assembly includes a plurality of airfoils extending from a first end to a second, opposed end, and a first platform at the first end. The first platform is joined to the plurality of airfoils. A second platform is at the second end. The second platform is also joined to the plurality of airfoils. At least one of the first platform, the second platform and the plurality of airfoils includes a three-dimensional arrangement of continuous fibers and at least one different one of the first platform, the second platform and the plurality of airfoils includes a two-dimensional arrangement of continuous fibers.

A method of fabricating a vane assembly according to an example of the present disclosure includes forming a vane assembly with a plurality of airfoils extending from a first end to a second, opposed end, and a first platform at the first end. The first platform is joined to the plurality of airfoils. A second platform is at the second end. The second platform is also joined to the plurality of airfoils. The forming includes forming at least one of the first platform, the second platform and the plurality of airfoils with a three-dimensional arrangement of continuous fibers and at least one different one of the first platform, the second platform and the plurality of airfoils with a two-dimensional arrangement of continuous fibers.

In a further embodiment of any of the foregoing embodiments, the forming includes a technique selected from the group consisting of resin transfer molding, fiber/resin pre-impregnation and combinations thereof.

In a further embodiment of any of the foregoing embodiments, the first platform, the second platform and the plurality of airfoils are each formed of a fiber-reinforced organic matrix material.

In a further embodiment of any of the foregoing embodiments, the first platform, the second platform and the plurality of airfoils are each formed of a ceramic matrix material.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
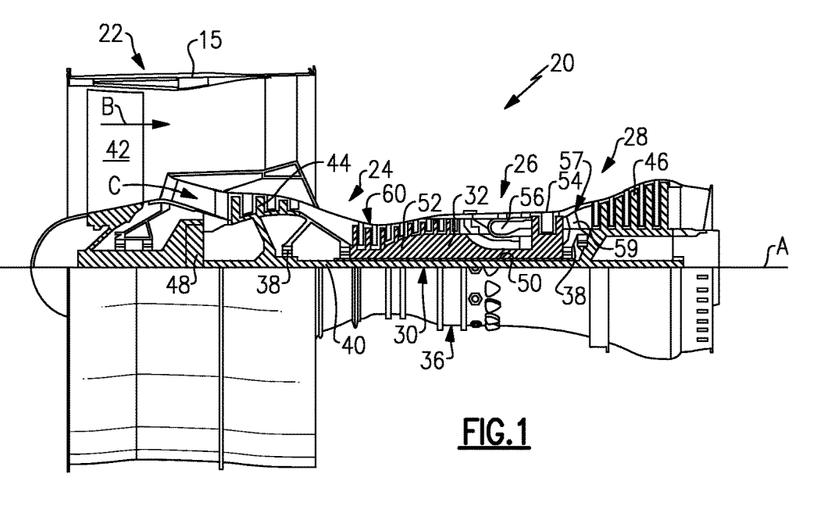
FIG. 1 illustrates an example gas turbine engine.

FIG. 1 schematically illustrates a gas turbine engine 20. The gas turbine engine 20 is disclosed herein as a two-spool turbofan that incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it is to be understood that the concepts described herein are not limited to use with two-spool turbofans and the teachings can be applied to other types of turbine engines, including three-spool architectures and ground-based engines, other turbomachinery or other machines that utilize vanes.

The engine 20 includes a low speed spool 30 and a high speed spool 32 mounted for rotation about an engine central axis A relative to an engine static structure 36 via several bearing systems, shown at 38. It is to be understood that various bearing systems at various locations may alternatively or additionally be provided, and the location of bearing systems may be varied as appropriate to the application.

The low speed spool 30 includes an inner shaft 40 that interconnects a fan 42, a low pressure compressor 44 and a low pressure turbine 46. The inner shaft 40 is connected to the fan 42 through a speed change mechanism, which in this example is a gear system 48, to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged between the high pressure turbine 54 and the low pressure turbine 46. The mid-turbine frame 57 further supports bearing system 38 in the turbine section 28. The inner shaft 40 and the outer shaft 50 are concentric and rotate via, for example, bearing systems 38 about the engine central axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and gear system 48 can be varied. For example, gear system 48 may be located aft of combustor section 26 or even aft of turbine section 28, and fan section 22 may be positioned forward or aft of the location of gear system 48.

The engine 20 in one example is a high-bypass geared engine. In a further example, the engine 20 has a bypass ratio that is greater than about six (6), with an example embodiment being greater than about ten (10), the gear system 48 is an epicyclic gear train, such as a planet or star gear system, with a gear reduction ratio of greater than about 2.3, and the low pressure turbine 46 has a pressure ratio that is greater than about five (5). In one disclosed embodiment, the bypass ratio is greater than about ten (10:1), the fan diameter is significantly larger than that of the low pressure compressor 44, and the low pressure turbine 46 has a pressure ratio that is greater than about five (5). Low pressure turbine 46 pressure ratio is pressure measured prior to inlet of low pressure turbine 46 as related to the pressure at the outlet of the low pressure turbine 46 prior to an exhaust nozzle. The gear system 48 can be an epicycle gear train, such as a planet or star gear system, with a gear reduction ratio of greater than about 2.3:1. It is to be understood, however, that the above parameters are only exemplary and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second.

Figure 2:
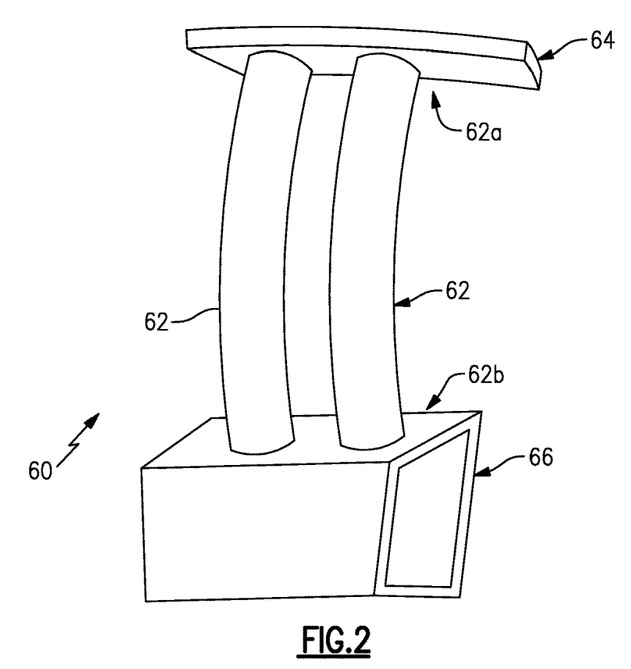
FIG. 2 illustrates an example vane assembly.

The compressor section 24 includes a plurality of vane assemblies 60 that are circumferentially arranged around the longitudinal axis A of the engine 20. FIG. 2 illustrates a representative one of the vane assemblies 60, which for purposes of description is also schematically shown in the axial view in FIG. 3 and in a circumferential view in FIG. 4. The vane assembly 60 includes a plurality of airfoils 62 that extend from a first end 62a to a second, opposed end 62b. Although the illustrated example shows two airfoils 62, it is to be understood that the vane assembly 60 can alternatively have more than two airfoils 62. Additionally, although the examples herein are described in the context of the vane assembly in the compressor 24, it is to be understood that the examples are applicable to vane assemblies of other sections of the engine 20, other turbomachinery or other machines that utilize static vanes.

Figure 3:
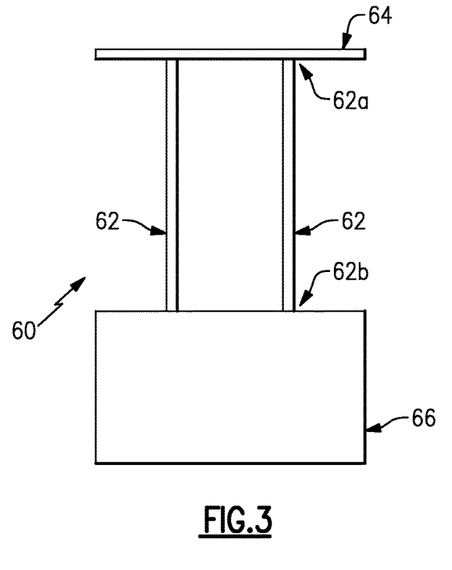
FIG. 3 schematically shows the vane assembly of FIG. 2 in an axial view.
Figure 4:
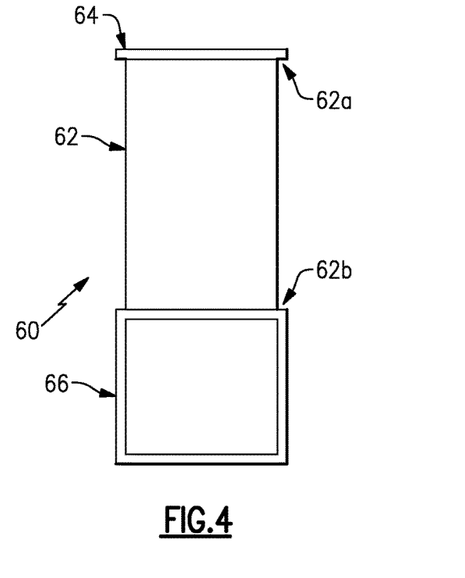
FIG. 4 shows the vane assembly of FIG. 3 in a circumferential view.

The vane assembly 60 further includes a first platform 64 arranged at the first ends 62a of the airfoils 62 and joined to airfoils 62 at the first ends 62a. In this example, relative to the longitudinal axis A of the engine 20, the first platform 64a is an outer diameter platform. A second platform 66 is arranged at the second ends 62b and joined to airfoils 62 at the second ends 62b. Relative to the longitudinal axis A of the engine 20, the second platform 66 is an inner diameter platform. The platforms 64/66 bound the respective inner and outer diameters of the core flow path C through the compressor 24. In contrast to blades that are rotatable, the airfoils 62 of the vane assembly 60 do not rotate and functionally serve to straighten turbulent flow from an upstream set of blades.

In one example, the vane assembly 60 is fabricated of a reinforced organic matrix or ceramic matrix composite material. In one example, the vane assembly 60 is fabricated exclusively of a reinforced organic matrix or ceramic matrix composite material. For example, the fibers of the reinforced composite material can be continuous fibers that are embedded in an organic matrix or ceramic matrix. The fibers can be carbon fibers, but other types of fibers, including but not limited to glass, ceramic, metallic and polymeric fibers, can additionally or alternatively be used. Alternatively, or in addition to continuous fibers, discontinuous fibers can be used, including but not limited to nano-sized reinforcing agents that have at least one nano-dimension of 500 nanometers or less. The organic matrix can be bismaleimide, polyimide or epoxy, but other polymerized carbon compounds can additionally or alternatively be used. The ceramic matrix can include oxides, nitrides, carbides, borides, silicides or combinations thereof.

Advanced fiber-reinforced, organic matrix composite materials can be used as a replacement, in certain environments, for metallic materials to reduce weight and achieve higher engine efficiency. The use of fiber-reinforced, organic matrix composite materials in the core flow path C of the engine 20 at temperatures of approximately 200-600° F. (90-316° C.) is limited by the operating temperature. Thus, with regard to the design of components having fiber-reinforced, organic matrix composite materials, designs for relatively low temperature environments outside of the core flow path C are typically not suited for higher temperature environments in the core flow path C. In this regard, the vane assembly 60 and fiber-reinforced, organic matrix composite material are designed for use in the core flow path C of the engine 20 at temperatures of approximately 200-600° F. (90-316° C.).

At least one of the first platform 64, the second platform 66 and the airfoils 62 include a three-dimensional (hereafter "3D") arrangement of continuous fibers and at least one different one of the first platform 64, the second platform 66, and the airfoils 62 (collectively) include a two-dimensional (hereafter "2D") arrangement of continuous fibers. In other words, any of the first platform 64, the second platform 66 and the airfoils 62 can include a 3D arrangement of continuous fibers and any other of the first platform 64, the second platform 66 and the airfoils 62 can include a 2D arrangement of continuous fibers.

Figure 5:
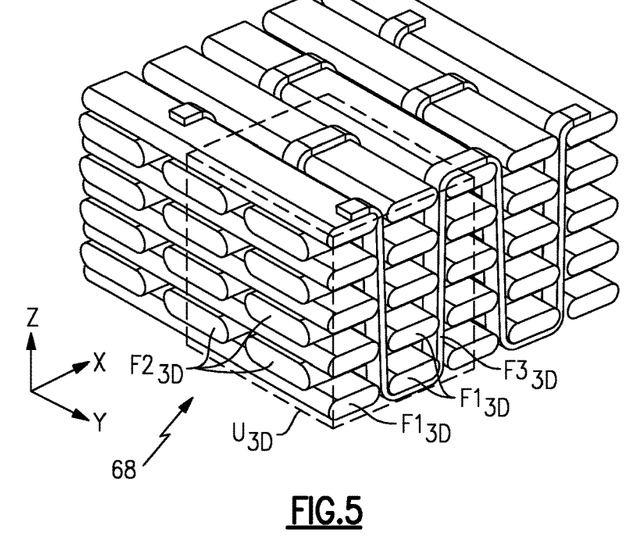
FIG. 5 illustrates an example three-dimensional arrangement of continuous fibers.

FIG. 5 shows one example of a 3D arrangement of fibers 68 that can be used. The 3D arrangement of fibers 68 is defined by a fiber repeat unit $U_{3D}$. The fiber repeat unit $U_{3D}$ has first continuous fibers $F1_{3D}$ and second continuous fibers $F2_{3D}$ that extend transversely to the first continuous fibers $F1_{3D}$ with respect to their longitudinal axes. Third continuous fibers $F3_{3D}$ extend orthogonally to the first continuous fibers $F1_{3D}$ and the second continuous fibers $F2_{3D}$ with respect to their longitudinal axes. As can be appreciated, there can be a wide range of different 3D arrangements of fibers other than the arrangement shown in the illustrated example. However, as used herein, a 3D arrangement of fibers, or reference to "3D," means a fiber arrangement having first coextending continuous fibers, second coextending continuous fibers that extend transversely to the first coextending continuous fibers with respect to their longitudinal axes, and third continuous fibers extending orthogonally to the first coextending continuous fibers and the second coextending continuous fibers with respect to their longitudinal axes.

Figure 6:
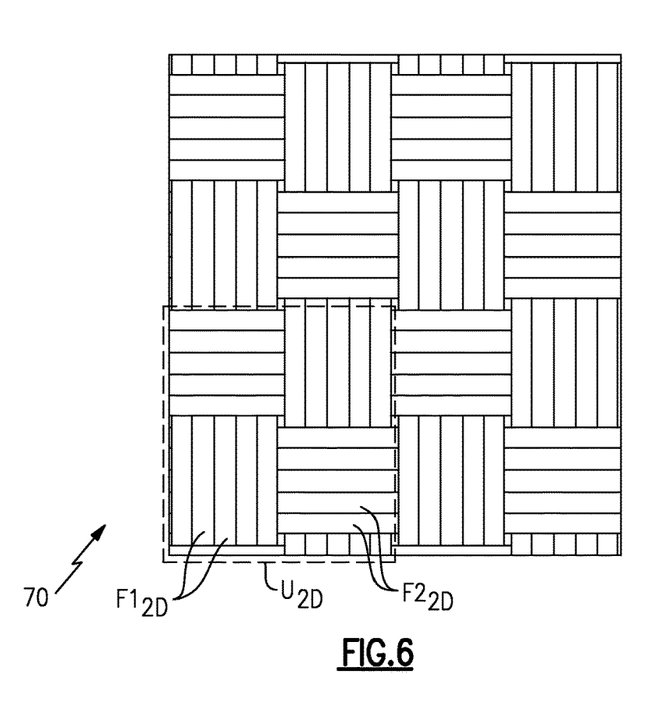
FIG. 6 illustrates an example two-dimensional arrangement of continuous fibers.

FIG. 6 illustrates an example 2D arrangement of fibers 70. The 2D arrangement of fibers 70 is defined by a fiber repeat unit $U_{2D}$ that has first continuous fibers $F1_{2D}$ and second continuous fibers $F2_{2D}$ that extend transversely to the first continuous fibers $F1_{2D}$ with respect to their longitudinal axes. The 2D arrangement of fibers 70 is free of any fibers that extend orthogonally to the first continuous fibers $F1_{2D}$ and the second continuous fibers $F2_{2D}$ with respect to their longitudinal axes. Thus, the continuous fibers $F1_{2D}/F2_{2D}$ extend substantially in an X-Y plane. As can be appreciated, there can be a wide range of different 2D arrangements other than the arrangement shown in the illustrated example.

However, as used herein, a 2D arrangement of fibers, or reference to "2D," means a fiber arrangement having first coextending continuous fibers, second coextending continuous fibers that extend transversely to the first coextending continuous fibers with respect to their longitudinal axes, and the 2D arrangement of fibers 70 is free of any fibers that extend orthogonally to the first coextending continuous fibers and the second coextending continuous fibers with respect to their longitudinal axes.

Furthermore, although the fibers in a 2D arrangement of fibers may be interwoven over and under each other, such an over/under arrangement does not render a fiber arrangement to be a 3D arrangement. 2D arrangements of fibers can include unidirectional arrangements and other fiber structures that are formed in sheets. Although a sheet has a thickness to it, the thickness of the sheet also does not render the sheet to be a 3D arrangement because there are no Z-fibers as in the fiber repeat unit of a 3D arrangement.

Figure 7:
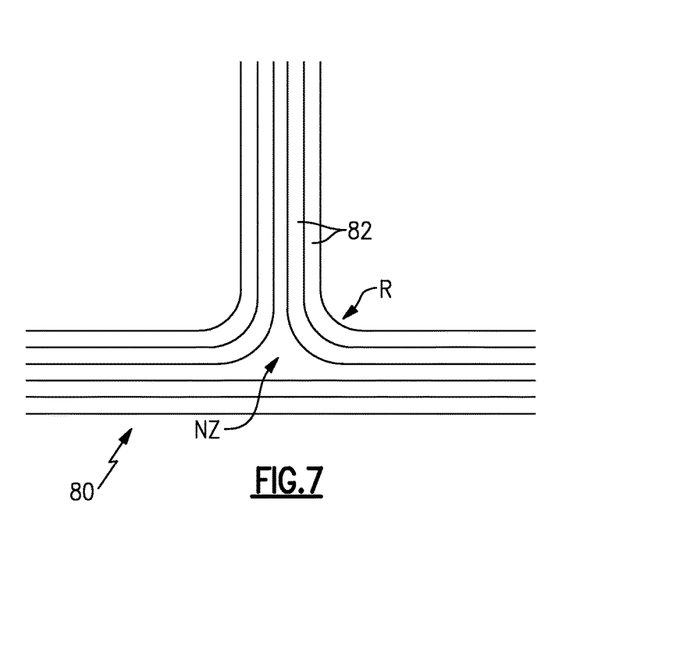
FIG. 7 illustrates a structure having a "noodle zone."

The use of the 3D arrangement of continuous fibers in combination with the 2D arrangement of continuous fibers in the vane assembly 60 facilitates avoiding or eliminating the use of "noodle zones," which are areas that can debit strength at elevated temperatures in the core flow path C. For example, referring to FIG. 7, a fiber structure 80 is shown. The fiber structure 80 is made of 2D fiber plies 82. The plies 82 are stacked to form the structure 80. However, at a radius R, where the plies 82 bend, there is a "noodle zone" (NZ) which is an enlarged, non-fiber area. The "noodle zone" can be filled with resin or other filler, or can be empty. The "noodle zone" is a weak area in the fiber structure 80 and can complicate manufacturing because of a tendency to "move" or "shift" during heating or curing cycles, which can result in abrupt fiber paths and/or wrinkling and buckling of adjacent fibers.

As will be described, the combined use of a 3D arrangement of continuous fibers with the 2D arrangement of continuous fibers in the vane assembly 60 can facilitate eliminating or reducing the presence of "noodle zones," and thus increases strength and permits use of the vane assembly in the core flow path C.

Figure 8:
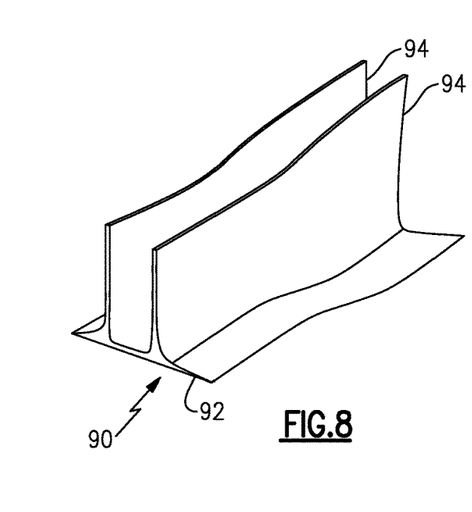
FIG. 8 illustrates an example Pi-section formed of a three-dimensional arrangement of continuous fibers.
Figure 9:
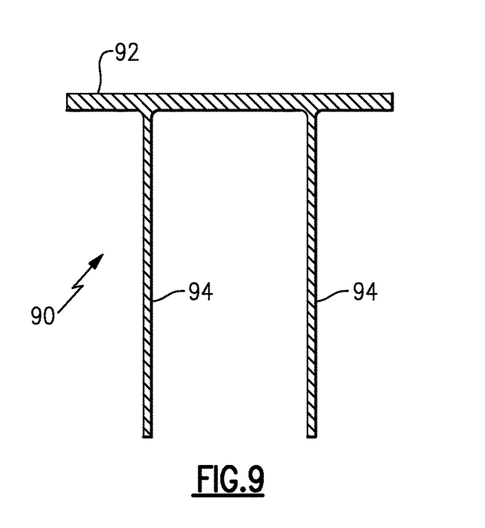
FIG. 9 schematically illustrates the Pi-section of FIG. 8.

Referring to FIG. 8, a Pi-section 90 is shown. The Pi-section 90 includes a 3D arrangement of fibers, according to the description above, and can be used to form a portion of the vane assembly 60. The Pi-section 90 is schematically shown for purposes of description in FIG. 9. The Pi-section 90 generally has a wall 92 and a plurality of legs 94 that protrude from one side of the wall 92. The Pi-section 90 can be designed and incorporated in the vane assembly 60 such that the legs 94 are airfoil-shaped and form the airfoils 62 and the wall 92 is platform-shaped and forms either of the platforms 64/66. Additionally or alternatively, the Pi-section 90 can be designed and incorporated as an attachment joint member to join together the airfoils 62 and either of the platforms 64/66.

Figure 10:
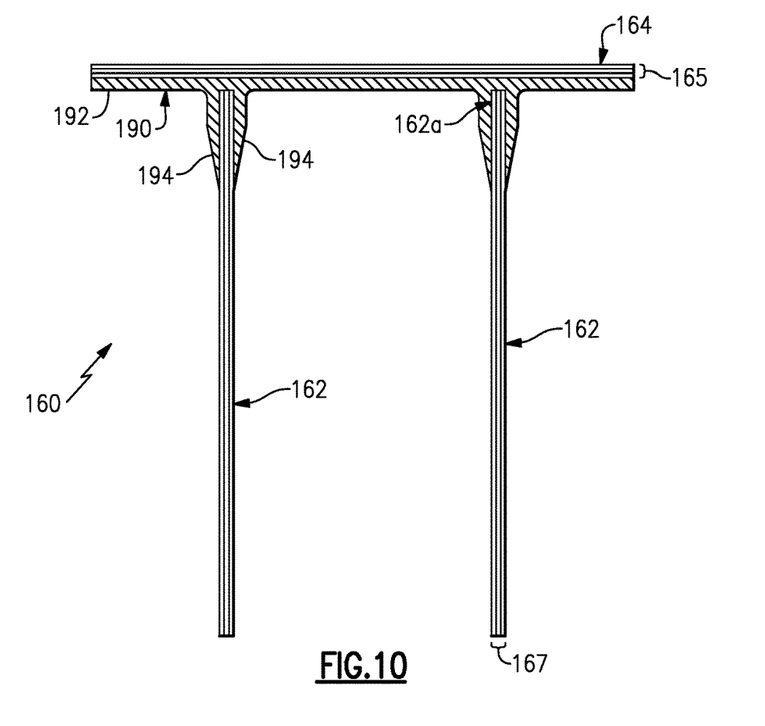
FIG. 10 illustrates an example vane assembly having a Pi-section.

FIG. 10 illustrates an example of a Pi-section 190 in a vane assembly 160. For purposes of description, only a portion of the vane assembly 160 is shown. In this disclosure, like reference numerals designate like elements where appropriate and reference numerals with the addition of one-hundred or multiples thereof designate modified elements that are understood to incorporate the same features and benefits of the corresponding elements. The wall 192 of the Pi-section 190 forms a part of the first platform 164. A remaining portion of the first platform 164 is formed by a plurality of 2D continuous fiber plies 165. Similarly, the airfoils 162 are formed of 2D fiber plies 167 that are joined with the legs 194 of the Pi-section 190.

In this example, the legs 194 coextend and are spaced apart such that the first end 162a of the airfoils 162 is received in the space between the legs 194. The legs 194 are attached or bonded to the first end 162a of the airfoil 162. In this description, any of numerous bonding or attachment techniques can be used where there is an attachment or bond joint between distinct pieces, such as but limited to, resin bonding, z-pinning, t-forming, stitching or combinations thereof. The attachment or bond joint is thus a distinct joint in which there is fiber discontinuity between the adjoined distinct pieces. In such a joint, the first end 162a of the airfoil 162 is interfacially attached or bonded with the inside surfaces of the legs 194. Thus, the use of the Pi-section 190 eliminates what otherwise would include a "noodle zone" at the joint between the platform 164 and the airfoils 162 if the vane assembly 160 were formed of an entirely 2D fiber arrangement.

Figure 11:
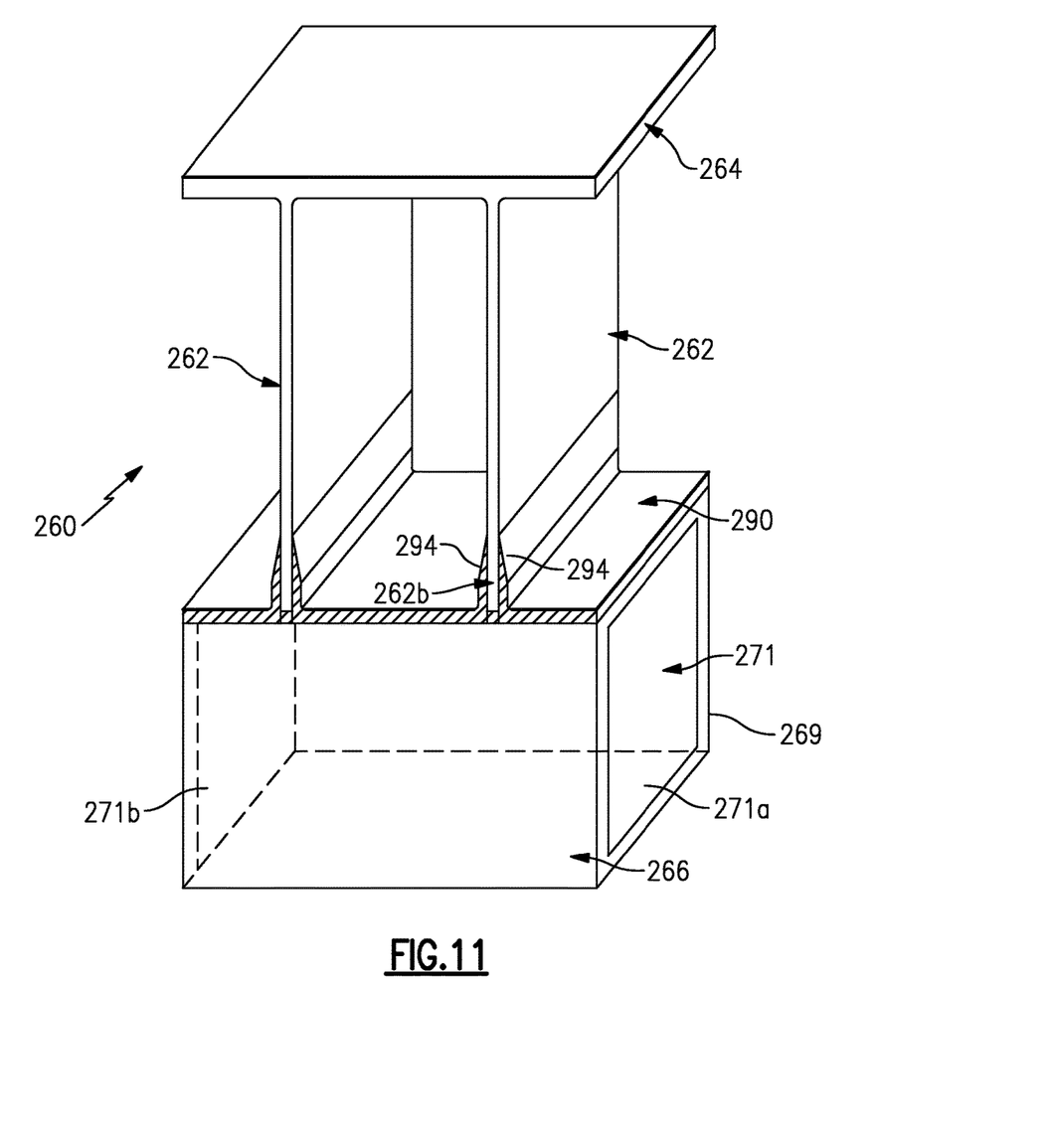
FIG. 11 illustrates another example vane assembly having a Pi-section.

FIG. 11 shows another example vane assembly 260 that incorporates a Pi-section 290. In this example, the Pi-section 290 serves to join the second platform 266 to the airfoils 262. Similar to the vane assembly 160 of FIG. 10, the second ends 262b of the airfoils 262 are received in the space between the legs 294 of the Pi-section 290. The second ends 262b are bonded or attached, as described above, to the legs 294 such that the airfoils 262 are interfacially attached or bonded with the inside surfaces of the legs 294.

In this example, the opposite face surface of the Pi-section 290 from which the legs 294 extend is attached or joined with a hollow structure 269 that forms a portion of the second platform 266. The hollow structure 269 is a wall that generally extends around an interior cavity 271 that opens at opposed ends 271a/271b. In this example, the Pi-section 290 includes a 3D arrangement of continuous fibers, according to the description above, and at least one of the first platform 264 and the airfoils 262 includes the 2D arrangement of continuous fibers. Thus, the use of the Pi-section 290 to attach the airfoils 262 to the second platform 266 eliminates what otherwise would include a "noodle zone" at the joint between the platform 266 and the airfoils 262 if the vane assembly 260 were formed of an entirely 2D fiber arrangement.

Figure 12:
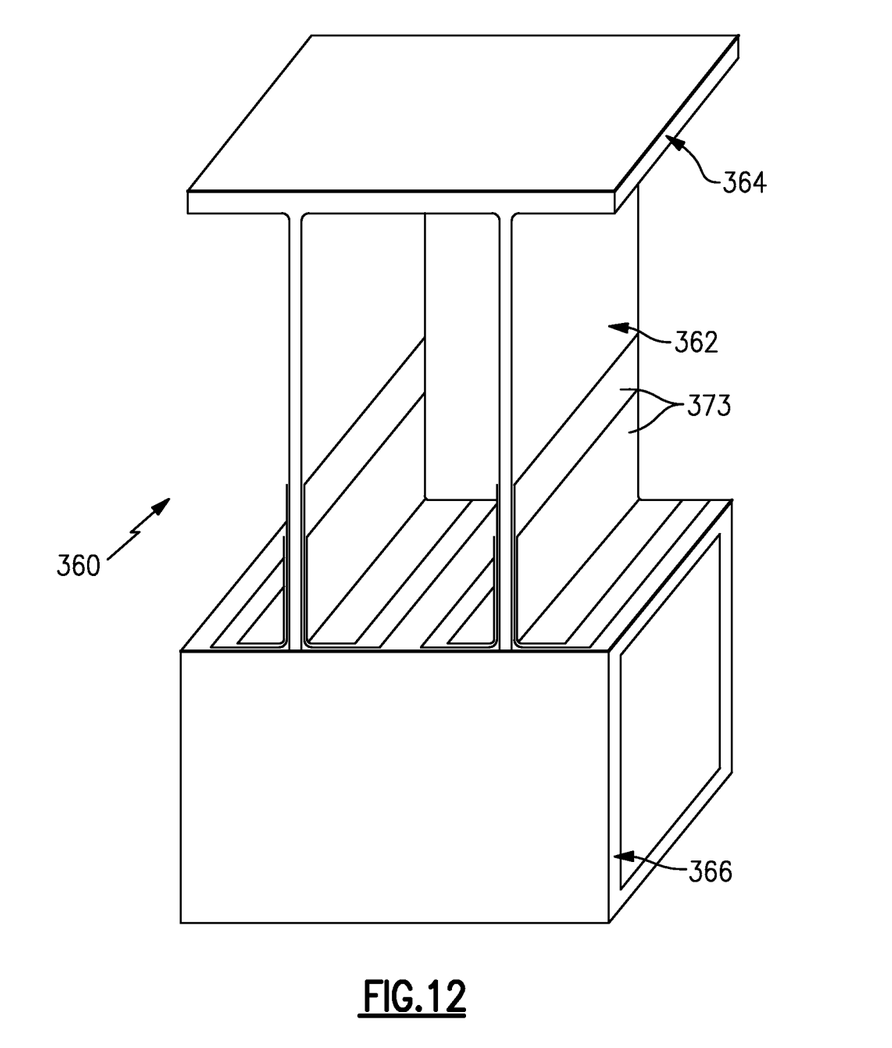
FIG. 12 illustrates another example vane assembly that utilizes two-dimensional fabric plies to attach portions of the vane assembly together.

FIG. 12 illustrates another example of a vane assembly 360 which utilizes a different technique than a Pi-section for joining the airfoils 362 to the second platform 366. In this example, a plurality of 2D fabric plies 373 joins the airfoils 362 and the second platform 366. The vane assembly 360 includes 2D fabric plies 373 on each circumferential side of each of the airfoils 362. The 2D fabric plies 373 generally form an L-shape such that one leg of the "L" is interfacially attached or bonded with the airfoil 362 and the other leg of the "L" is interfacially attached or bonded with the second platform 366. Similarly or alternatively, the first platform 364 can be attached or bonded to the airfoils 362 using 2D fabric plies. At least one of the first platform 364, the second platform 366 and the airfoils 362 includes a 3D arrangement of fibers, according to the description above, and at least one different one of the first platform 364, the second platform 366 and the airfoils 362 includes a 2D arrangement of fibers, according to the description above. Thus, the use of 3D and 2D fiber arrangements eliminate what otherwise would include a "noodle zone" at the joint between the platform 366 and the airfoils 362 if the vane assembly 360 were formed of an entirely 2D fiber arrangement.

Figure 13:
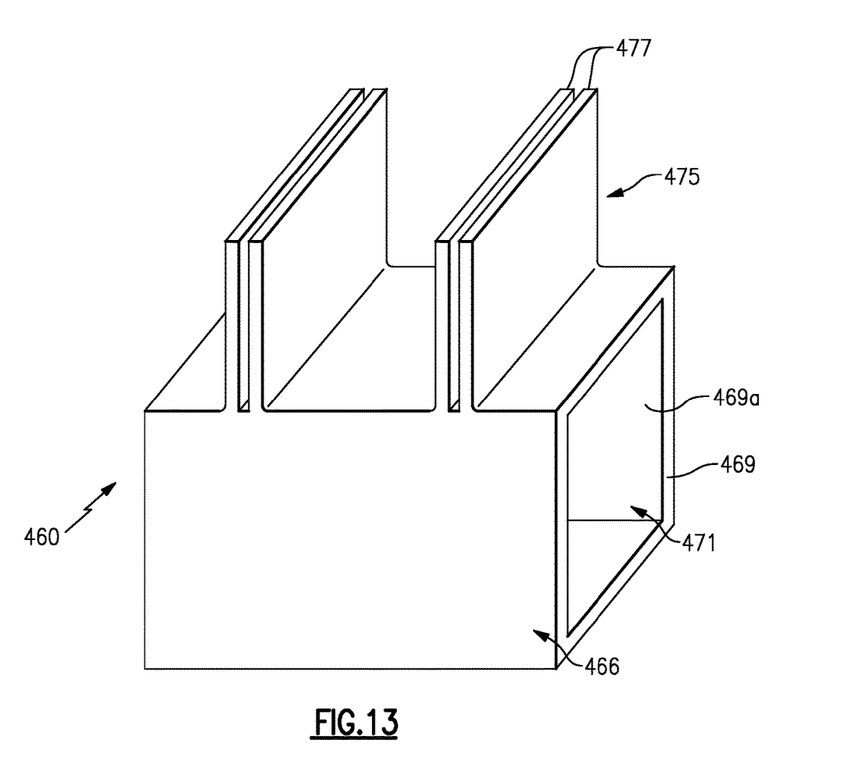
FIG. 13 illustrates a portion of another example vane assembly having integral attachment features.

FIG. 13 illustrates a portion of another example vane assembly 460. In this example, instead of 2D fabric plies or a Pi-section, attachment portions 475 join the airfoils (not shown). Similar to the example of FIG. 11, the second platform 466 is a hollow structure 469 that extends around an interior cavity 471. The wall includes a first wall portion 469a that extends around the interior cavity 471. The wall 469 also integrally includes the attachment portions 475 that protrude outwardly from the first wall portion 469a. The term "integrally" means that the fibers of the second platform 466 are continuous throughout the second platform.

Each of the attachment portions 475 includes a pair of coextending, spaced apart walls 477, between which one of the airfoils (not shown) is received, similar to the Pi-section 290 of FIG. 11. The airfoils are then attached or bonded, as described above, with the inside surfaces of the walls 477. Thus, the walls 477 are similar to the legs of the Pi-section, but are integral with the wall 469 with respect to the continuity of the fibers. For example, the wall 469 is formed of the 3D arrangement of continuous fibers and thus there is no fiber discontinuity between the attachment features 475 and the wall portion 469a. Thus, the use of the 3D arrangement of continuous fibers and the 2D arrangement of continuous fibers eliminates what otherwise would include a "noodle zone" at the joint between the platform 466 and the airfoils if the vane assembly 460 were formed of an entirely 2D fiber arrangement.

Figure 14:
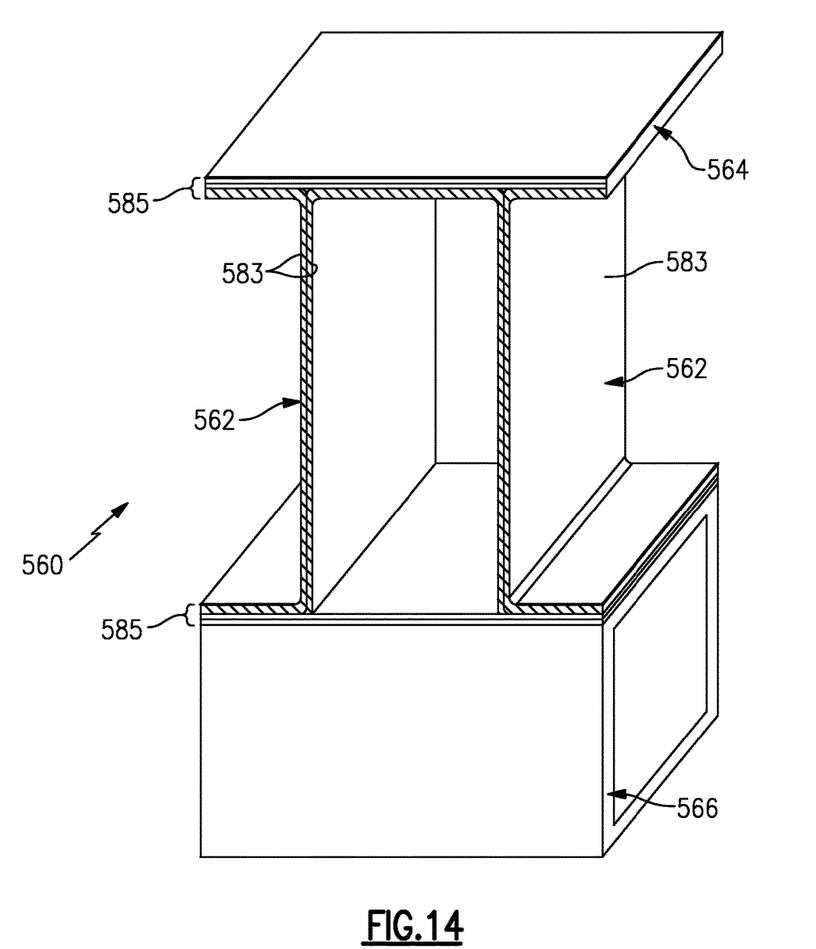
FIG. 14 illustrates another example vane assembly that utilizes C-section members formed of three-dimensional arrangements of continuous fibers.

FIG. 14 illustrates another example vane assembly 560 that is formed from numerous 2D and 3D arrangements. In this example, the vane assembly 560 includes C-channel members 583 that each has a 3D arrangement of continuous fibers, according to the description above. The outer C-channel members 583 are arranged such that the legs of the "C" form, at least in part, the first platform 564 and the second platform 566. The main, vertical part of the "C" forms, at least in part, a respective one of the airfoils 562. A central C-channel member 583 intermediate of the outside C-channel members 583 forms, at least in part, a portion of the first platform 564, while its legs form parts of the respective airfoils 562. The C-channel members 583 can be joined to a hollow structure to form the second platform 566. Additional 2D fabric plies 585 form a remaining portion of the first platform 564 and the second platform. Thus, the use of the 3D arrangement of continuous fibers and the 2D arrangement of continuous fibers eliminates what otherwise would include a "noodle zone" at the joints between the platforms 564/566 and the airfoils 562 if the vane assembly 560 were formed of an entirely 2D fiber arrangement.

Figure 15:
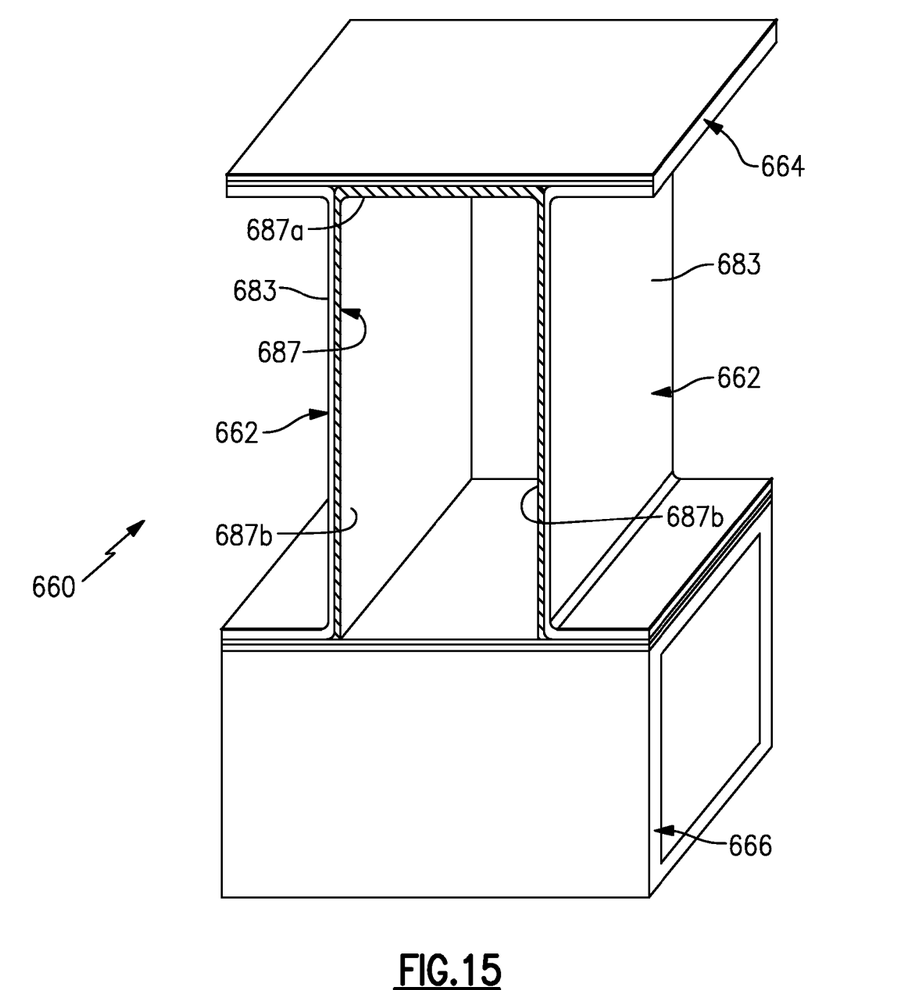
FIG. 15 illustrates another example vane assembly that utilizes a U-section member formed of a three-dimensional arrangement of continuous fibers.

FIG. 15 shows another example vane assembly 660. In this example, the vane assembly 660 includes a U-section member 687 that is formed of the 3D arrangement of continuous fibers, according to the description above. The top 687a of the U-section member 687 forms, at least in part, the first platform 664 and the legs 687b of the U-section member 687 form, at least in part, the airfoils 662. C-section members 683 are arranged adjacent the legs 687b of the U-section member 687 to form a portion of the respective airfoils 662 and portions of the platforms 664/666. In this example, the C-section members 683 are formed of 2D arrangements of continuous fibers. Additional 2D fabric plies can be used to form a remaining portion of the first platform 664 and to bond the U-section member 687 and C-section member 683 to the hollow structure of the second platform 666. Thus, the use of the 3D arrangement of continuous fibers and the 2D arrangement of continuous fibers eliminates what otherwise would include a "noodle zone" at the joints between the platforms 664/666 and the airfoils 662 if the vane assembly 660 were formed of an entirely 2D fiber arrangement.

Figure 16:
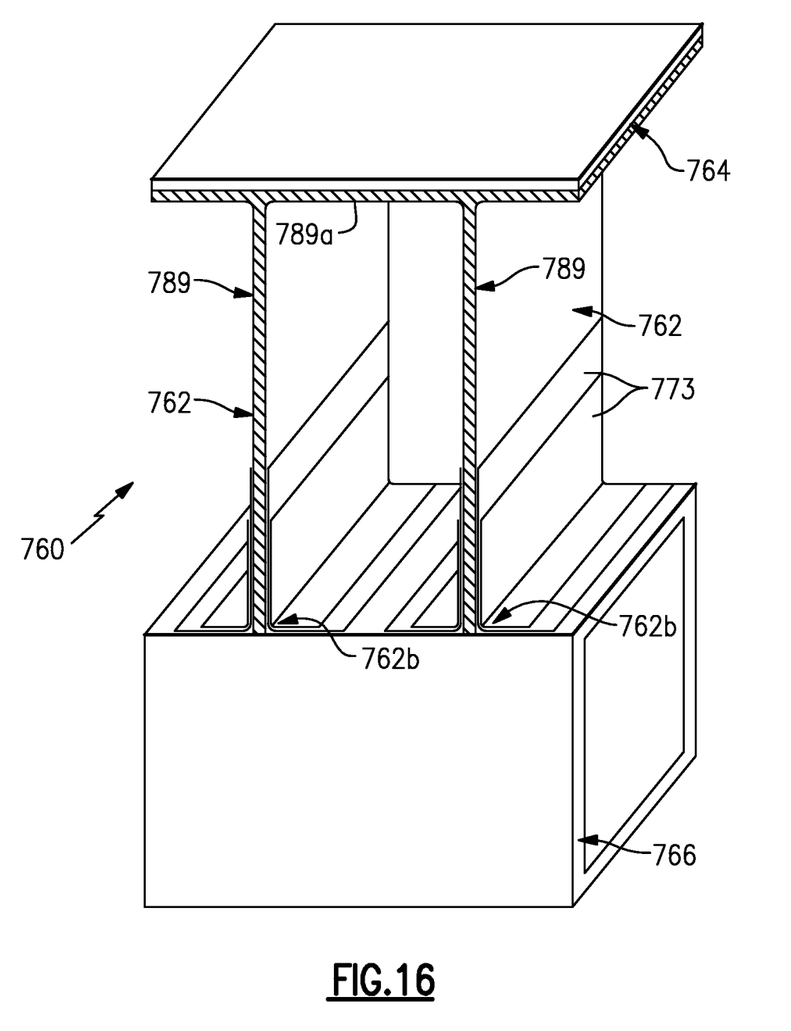
FIG. 16 illustrates another example vane assembly that utilizes T-section members formed of three-dimensional arrangements of continuous fibers.

FIG. 16 illustrates another example of a vane assembly 760. In this example, the vane assembly 760 includes T-section members 789 that are formed of the 3D arrangement of continuous fibers, according to the description above. The remaining portions of the vane assembly 760 can be formed of the 2D arrangement of continuous fibers. In this example, the vertical portion of the T-shape of the T-section members 789 forms the airfoils 762, and the horizontal portions of the T-section members 789 form, at least in part, the first platform 764. The T-section members 789 are joined at a joint 789a using any of the attachment or bonding techniques described herein. The second ends 762b of the airfoils 762 are joined to the second platform 766 using 2D fiber plies 773, similar to the vane assembly 360 of FIG. 12. Thus, the use of the 3D arrangement of continuous fibers and the 2D arrangement of continuous fibers eliminates what otherwise would include a "noodle zone" at the joints between the platforms 764/766 and the airfoils 762 if the vane assembly 760 were formed of an entirely 2D fiber arrangement.

The vane assemblies 60/160/260/360/460/560/660/770 described herein can be formed using a technique selected from resin transfer molding, fiber/resin preimpregnation and combinations thereof. For example, the portion or portions that are formed from the 3D arrangement of continuous fibers can initially be dry with respect to inclusion of any resin and the portion or portions that are formed from the 2D arrangement of continuous fibers can be tackified or preimpregnated with the selected resin. As used herein, the term "tackified" or variations thereof refers a fiber structure that has a light loading of binder on the surface of the fiber structure (e.g., plies). The binder facilitates handling of the fiber structure for cutting and lay-up operations. Typically, the binder is compatible with the selected resin that is used for impregnation and can be the same composition of resin used for impregnation. The dry 3D arrangement of continuous fibers can then be assembled with the preimpregnated 2D arrangement of continuous fibers to form a "preform" having the nominal shape of the vane assembly 60/160/260/360/460/560/660/770. The "preform" can then be situated in a mold and liquid resin injected into the 3D arrangement of continuous fibers. Depending upon on the selected resin and its curing properties, the molded preform can then be subjected to one or more thermal curing cycles. Thus, the use of the 3D arrangement of continuous fibers also potentially reduces the amount of labor involved in manually laying-up 2D fiber plies, thus simplifying the fabrication and reducing costs.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A vane assembly comprising:
   a plurality of airfoils extending from a first end to a second, opposed end;

a first platform at the first end, the first platform being joined to the plurality of airfoils;

a second platform at the second end, the second platform being joined to the plurality of airfoils, at least one of the first platform, the second platform and the plurality of airfoils including a three-dimensional arrangement of continuous fibers and at least one different one of the first platform, the second platform and the plurality of airfoils including a two-dimensional arrangement of continuous fibers, the second platform being a hollow structure including walls that define an interior cavity that opens at opposed ends;

wherein the walls include a first portion extending around the interior cavity and attachment portions protruding outwardly from the first portion, and each of the attachment portions includes a pair of coextending spaced-apart walls, between which one of the plurality of airfoils is received.

2. The vane assembly as recited in claim 1, wherein the three-dimensional arrangement of fibers is a Pi-section having a wall and a plurality of legs protruding from one side of the wall.

3. The vane assembly as recited in claim 2, wherein the wall is the first platform and the plurality of legs is the plurality of airfoils.

4. The vane assembly as recited in claim 1, wherein the first platform and the plurality of airfoils include the three-dimensional arrangement of continuous fibers.

5. The vane assembly as recited in claim 1, wherein the walls of the hollow structure include the three-dimensional arrangement of continuous fibers.

6. The vane assembly as recited in claim 1, wherein the hollow structure is joined with the plurality of airfoils by two-dimensional fabric plies.

7. The vane assembly as recited in claim 1, wherein at least one of the first platform and the second platform is joined to the plurality of airfoils at a distinct joint in which there is fiber discontinuity with respect to continuous fibers of the at least one of the first platform and the second platform and continuous fibers of the plurality of airfoils.

8. The vane assembly as recited in claim 1, wherein the first platform, the second platform and the plurality of airfoils are each formed of a fiber-reinforced organic matrix material.

9. The vane assembly as recited in claim 1, wherein the first platform, the second platform and the plurality of airfoils include transition areas there between that are free of noodle zones, the noodle zones being a plurality of stacked fiber plies each having a two-dimensional arrangement of continuous fibers, with an enlarged non-fiber area at a radius where the plurality of stacked fiber plies bend.

10. The vane assembly as recited in claim 1, wherein:
the three-dimensional arrangement of fibers includes a fiber repeat unit $U_{3D}$ having first continuous fibers $F1_{3D}$ and second continuous fibers $F2_{3D}$ that extend transversely to the first continuous fibers $F1_{3D}$ with respect to their longitudinal axes, and third continuous fibers $F3_{3D}$ that extend orthogonally to the first continuous fibers $F1_{3D}$ and the second continuous fibers $F2_{3D}$ with respect to their longitudinal axes; and
the two-dimensional arrangement of fibers includes a fiber repeat unit $U_{2D}$ having first continuous fibers $F1_{2D}$ and second continuous fibers $F2_{2D}$ that extend transversely to the first continuous fibers $F1_{2D}$ with respect to their longitudinal axes, and the two-dimensional arrangement of fibers is free of any fibers that extend orthogonally to the first continuous fibers $F1_{2D}$ and the second continuous fibers $F2_{2D}$ with respect to their longitudinal axes.

11. The vane assembly as recited in claim 1, wherein the vane assembly is located in the core flow path of a gas turbine engine.

12. A vane assembly comprising:
a plurality of airfoils extending from a first end to a second, opposed end;
a first platform at the first end, the first platform being joined to the plurality of airfoils;
a second platform at the second end, the second platform being joined to the plurality of airfoils, at least one of the first platform, the second platform and the plurality of airfoils including a three-dimensional arrangement of continuous fibers and at least one different one of the first platform, the second platform and the plurality of airfoils including a two-dimensional arrangement of continuous fibers;
wherein a Pi-section joins at least one of the first platform and the second platform with the plurality of airfoils, the Pi-section having a wall and a plurality of legs protruding from one side of the wall, the wall being interfacially joined to the at least one of the first platform and the second platform, and the plurality of legs being interfacially joined with the plurality of airfoils.

13. A method of fabricating a vane assembly, the method comprising:
forming a vane assembly with a plurality of airfoils extending from a first end to a second, opposed end, a first platform at the first end, the first platform being joined to the plurality of airfoils, a second platform at the second end, the second platform being a hollow structure including walls that define an interior cavity that opens at opposed ends, the second platform being joined to the plurality of airfoils, the forming including forming at least one of the first platform, the second platform and the plurality of airfoils with a three-dimensional arrangement of continuous fibers and at least one different one of the first platform, the second platform and the plurality of airfoils with a two-dimensional arrangement of continuous fibers;
wherein the walls includes a first portion extending around the interior cavity and attachment portions protruding outwardly from the first portion, and each of the attachment portions includes a pair of coextending spaced-apart walls, between which one of the plurality of airfoils is received.

14. The method as recited in claim 13, wherein the forming includes a technique selected from the group consisting of resin transfer molding, fiber/resin preimpregnation and combinations thereof.

15. The method as recited in claim 13, wherein the first platform, the second platform and the plurality of airfoils are each formed of a fiber-reinforced organic matrix material.

16. The method as recited in claim 13, wherein the first platform, the second platform and the plurality of airfoils are each formed of a ceramic matrix material.

17. A method of fabricating a vane assembly, the method comprising:
forming a vane assembly with a plurality of airfoils extending from a first end to a second, opposed end, a first platform at the first end, the first platform being joined to the plurality of airfoils, a second platform at the second end, the second platform being joined to the plurality of airfoils, the forming including forming at least one of the first platform, the second platform and the plurality of airfoils with a three-dimensional arrangement of continuous fibers and at least one different one of the first platform, the second platform and the plurality of airfoils with a two-dimensional arrangement of continuous fibers;

wherein a Pi-section joins at least one of the first platform and the second platform with the plurality of airfoils, the Pi-section having a wall and a plurality of legs protruding from one side of the wall; and wherein the forming comprises interfacially joining the wall to at least one of the first platform and the second platform, and interfacially joining the plurality of legs with the plurality of airfoils.

* * * * *